Figure 1:
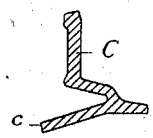

No. 733,085. PATENTED JULY 7, 1903.
S. B. SHELDON.
METHOD OF MANUFACTURING RAILWAY RAIL JOINT PLATES.
APPLICATION FILED DEC. 15, 1902.
NO MODEL.

WITNESSES:
A. V. A. B. McCauley
Loretto O'Connell

INVENTOR
Samuel B. Sheldon,
BY
Geo. H. Parmelee,
his ATTORNEY.

No. 733,085. Patented July 7, 1903.

UNITED STATES PATENT OFFICE.

SAMUEL B. SHELDON, OF JOLIET, ILLINOIS, ASSIGNOR TO THE ILLINOIS STEEL COMPANY, A CORPORATION OF ILLINOIS.

METHOD OF MANUFACTURING RAILWAY-RAIL-JOINT PLATES.

SPECIFICATION forming part of Letters Patent No. 733,085, dated July 7, 1903.

Application filed December 15, 1902. Serial No. 135,179. (No model.)

*To all whom it may concern:*

Be it known that I, SAMUEL B. SHELDON, of Joliet, in the county of Will and State of Illinois, have invented a new and useful Improvement in Methods of Manufacturing Railway-Rail-Joint Plates, of which the following is a full, clear, and exact description, reference being had to the accompanying drawings, which form a part of this specification.

My invention relates to an improved method of manufacturing railway-rail-joint plates, and particularly to the manufacture of plates of the type which are provided with base-flanges shaped to fit the base-flanges of the rails. The ordinary method heretofore practiced in the manufacture of these plates consists in rolling bars of considerable length to the exact cross-section of the finished plates, the bending of the base-flange portion to its proper shape being accomplished by what is commonly known as a "collar-roll," then severing said pieces into the desired lengths, and finally punching and slotting the same for the bolt and spike seats. To this practice various objections exist, some of which may be briefly stated as follows: It is an essential feature of joint-plates of this type that they conform to and fit as closely as possible the section of rail to which they are to be applied and that the punching and slotting of the same shall be uniform and true. In the practice above described, the final shape of the plate being imparted by the rolls, this result is very difficult to obtain, since the rapid wear of the roll-collars causes a variation in finish, which may be very considerable in rolling a larger number of the plates, and other variations, due to differences in the temperature which the bar is finished, necessarily occur. Furthermore, the standard rail-sections used by different roads vary widely in their design, and new designs varying more or less from the old are frequently being adopted. This necessitates keeping on hand a large number of roll-collars, and these must be shifted frequently in passing from one job to another. Furthermore, it has not heretofore been found practicable to shear a bar having the section of the finished plate, due in part to the character of the cut which must be made and in part to the fact that the shape of the anvil or ledger-blade is necessarily such as to make it very difficult to move the bar through the same on account of the fins or burs formed in shearing. It has therefore been necessary to saw the rolled bars to length with a hot saw, thereby inducing slight errors or variations in length, due to the fact that all bars are not finished at the same temperature, and the amount of contraction is therefore variable. It is also impossible to saw rapidly with a hot saw and at the same time stop the bar exactly at the point where it is to be cut. The saw also leaves a bur or fin across the end of the plate which must be chipped off by hand, each plate thus having to be several times handled.

The object of my invention is to overcome all the objections above pointed out and to provide a simple and thoroughly practical method of manufacturing joint-plates by which uniformity and accuracy of fit are insured and the time and labor involved are materially decreased.

With this object in view the invention consists in the novel steps hereinafter described, and pointed out in the appended claims, in which the bars are left by the rolls in a partly-finished shape and of such contour that they may be readily sheared to the desired length and after being punched and slotted in the usual manner are given their finished form by means of a suitable press or former. Before being thus pressed or formed the bars are preferably reheated.

The precise nature of my invention and the manner in which it is carried out in practice will be better understood by reference to the accompanying drawings, in which—

Figure 2:
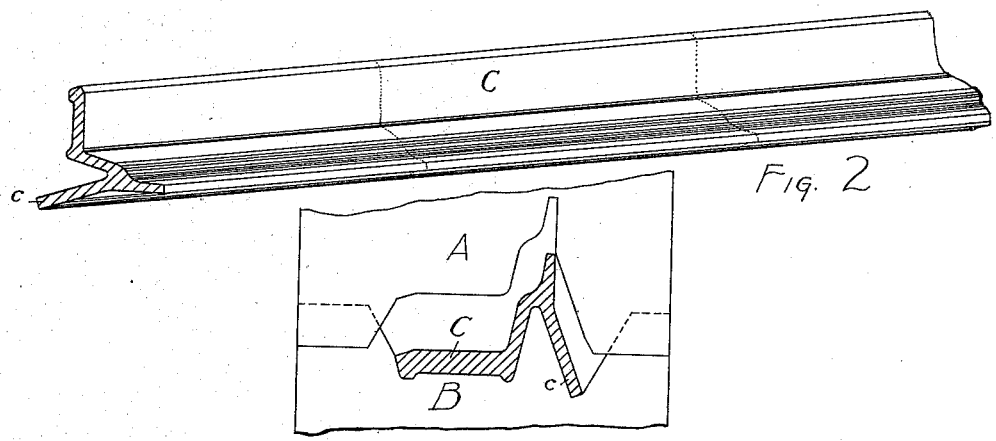
Figure 3:
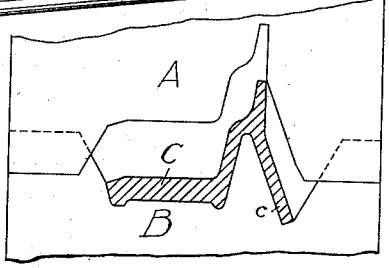
Figure 4:
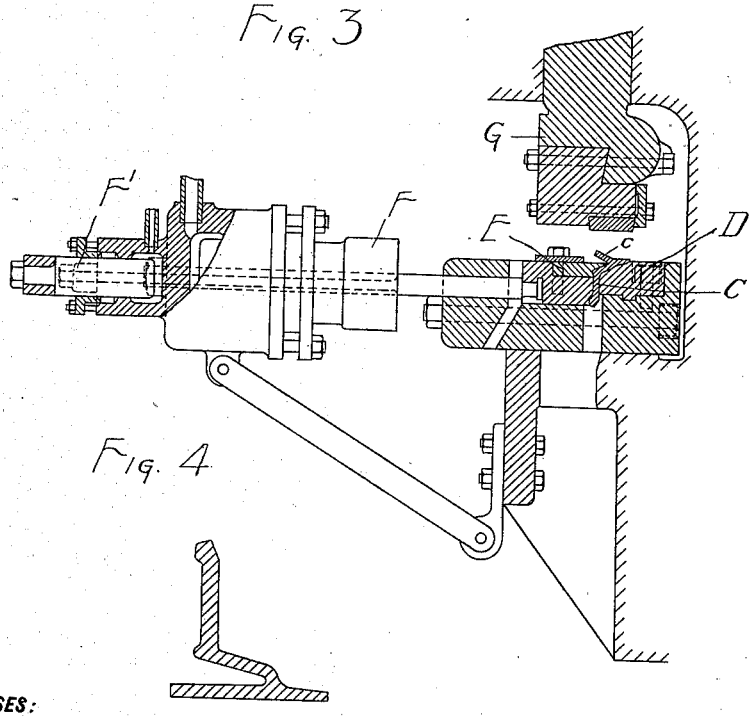
Figure 5:
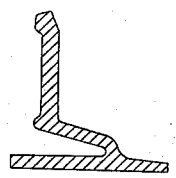

Figure 1 is an end view showing the shape of the bar as it leaves the guide-box of the mill in my improved process; Fig. 2, a perspective view of a bar in the condition in which it leaves the roll, the points where it is to be sheared being indicated by dotted lines. Fig. 3 is a view illustrating the step of shearing the rolled shape into lengths; Fig. 4, a sectional view of a portion of a press, showing the manner in which the plates are finished; and Fig. 5, an end view of one of the finished plates.

In the practice of my invention I employ rolls of such contour as to cause the bar to leave the rolling-mill in the form shown in Figs. 1 and 2, with the flange c standing open at an acute angle to its finished position. As these bars leave the rolls they pass to a suitable shearing-machine, where they are cut into lengths, as indicated by the dotted lines in Fig. 2. Suitable shears for this purpose are shown in Fig. 3, in which A indicates the movable blade, and B the fixed anvil or ledger-blade. It will be readily apparent to those skilled in the art of metal-shearing that by reason of the open position of the flange c not only can the bar be much more readily moved through the shears, but that a much better and stronger form of shear-blades is made possible and the character of the cut changed radically. From this operation the sections or plates are then passed through the regular punching and slotting operation. They then go direct to a heating-furnace and are reheated. The entire section or plate may be brought up to a working—say a fair red—heat; but preferably the flange portion only is brought to this temperature, since if the section is heated all over it makes a camber in cooling, owing to the variable thickness of the section. The sections are then withdrawn from the furnace, and by a conveyer or other suitable means are carried to a suitable press. This press may be of various forms. A suitable form is shown in section in Fig. 4. In this figure, D represents a removable interchangeable anvil-block, upon and against which the hot plate or section is seated. E is a tongue or former, also interchangeable and secured to a ram or plunger F, which is actuated by a hydraulic cylinder F' or by any other suitable power. The tongue E is as nearly as possible a counterpart of the rail-flange to which the plates are to be fitted. G is a vertically-moving ram, which is operated by any suitable power to bend the flange c to the former. After this ram has been operated to bend the flange in this manner it is raised and the plate is shoved out by the next incoming plate and is ready for shipment.

The anvil D and former E may be very quickly changed for others of different contour, so that the plates can be made to fit any rail.

The method described not only permits the use of shears in cutting the rolled bar into sections and avoids the objections of the hot-saw method hereinbefore pointed out, but the bar may be sheared, slotted, and punched when cold, thereby avoiding the errors due to different degrees of contraction at varying temperatures and insuring a high degree of accuracy and uniformity. In fact, accuracy of fit is a very important result of the practice of my invention, since not only does the operation of pressing straighten up and true the plates generally to the desired shape, but the reheating and subsequent pressing remove all fins left by the shears, and thus insures close fitting of the plates to the rails.

It is not necessary that the steps of punching and slotting shall be performed before the operation of pressing, since these steps may succeed the latter. The order of operations above described is, however, preferred by me.

I do not wish to limit the application of my invention to bars or plates of the exact section shown in the drawings, as it will be found useful with shapes which differ somewhat in detail, but which present the same general features.

Having thus described my invention, what I claim as new, and desire to secure by Letters Patent, is—

1. The art of manufacturing railway-rail-joint plates or bars having rail-seating base portions or flanges, which consists in first rolling a bar to approximately the shape in cross-section of the finished plate or bar, but with the rail-seating portion of its base bent out of the plane of the said base, and subsequently pressing the plate to bring said rail-seating portion to its true position and to shape the plate to a working fit.

2. The art of manufacturing railway-rail-joint plates or bars having rail-seating base portions or flanges, which consists in first rolling a bar to a shape approximating the finished shape, but having a greater angle between its rail-seating base-flange and its web portion to facilitate subsequent shearing, then placing said bar on an anvil or ledger-blade and shearing the same into lengths, and finally pressing each length to partially close the said angle and shape the plate to a fit.

3. The art of manufacturing railway-rail-joint plates or bars having rail-seating base portions or flanges, which consists in rolling a bar to a shape approximating the finished shape, but with its rail-seating base portion bent downwardly at an acute angle to its true position to facilitate the operation of a shearing-tool, then shearing the bar into lengths, and subsequently reheating the sheared lengths and bending or pressing them to bring said base portions to their true positions and to shape the plates as a whole to a working fit.

In testimony whereof I have affixed my signature in presence of two witnesses.

S. B. SHELDON.

Witnesses:
H. S. NORTON,
T. M. POWELL.